Jan. 30, 1951 — S. G. LUDINGTON ET AL — 2,539,916
RECIPROCATING CUTTER FOR PLASTICS
Filed May 27, 1948

INVENTORS.
Samuel G. Ludington
Kenneth E. Stober
BY
*Griswold & Burdick*
ATTORNEYS Patented Jan. 30, 1951

2,539,916

UNITED STATES PATENT OFFICE 2,539,916

RECIPROCATING CUTTER FOR PLASTICS

Samuel G. Ludington and Kenneth E. Stober, Midland, Mich., assignors to The Dow Chemical Company, Midland, Mich., a corporation of Delaware Application May 27, 1948, Serial No. 29,596

1 Claim. (Cl. 18—12)

This invention relates to a cutter for plastics and especially to one which performs its function without producing any "fines" or other irregular broken pieces of the plastic being cut.

It is common practice to extrude organic thermoplastics as continuous filaments, strips or sheets to cut the extruded product into small particles to be used as the feed in molding or extrusion operations. A common failing of most cutters is their tendency to produce substantial and undesirable amounts of non-uniform particles, and especially of those dust-like sizes known as "fines."

It is an object of the present invention to provide an apparatus for cutting strips of plastics, and especially adapted for cutting freshly extruded filaments of polystyrene, to uniform size without producing any significant amount of fines.

The apparatus of the invention is a reciprocating cutter, so mounted with respect to the strip- or filament-forming orifice in a vertical face of a plastics extruder that, in its cycle, each point on the cutting edge of the thin cutter blade moves in an elliptical path downward toward the vertical face of the extruder, still downward through a point of tangency with the said face, further downward and away from the extruder, then upward through the other half of the elliptical path to the initial point. This movement is repetitive, and its frequency is adjusted to shear the desired length of extruded strip or filament from the orifice plate at each pass. The apparatus, in its preferred form has a means for cooling the blade after its frictional contact with the hot plastic, a cooling bath or spray into or through which the severed globules or pellets may fall for cooling and hardening, and auxiliary apparatus for drying the so-formed uniform molding granules.

Figure 3:
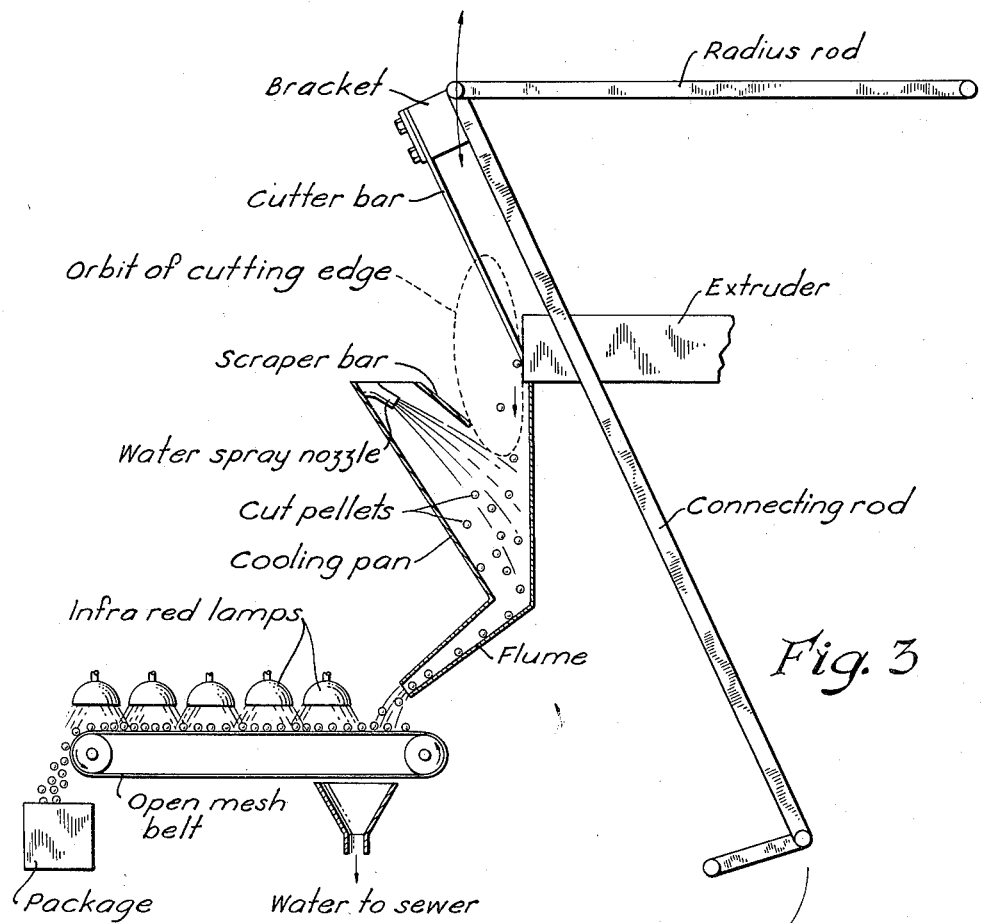
Figure 2:
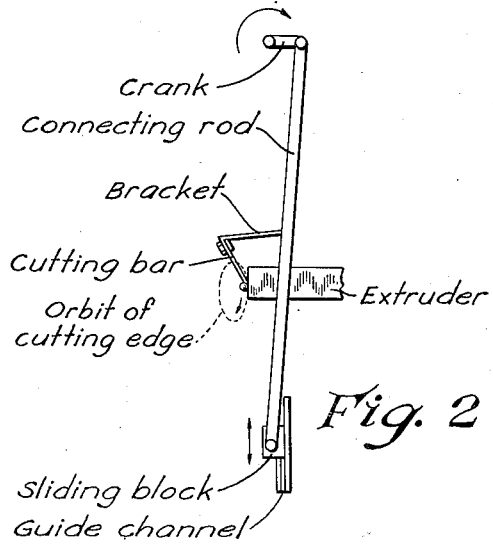
Figure 1:
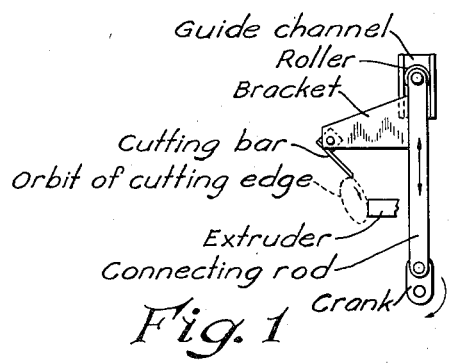

The invention may be understood and will be explained with reference to the accompanying drawing, wherein Figs. 1, 2 and 3 are diagrammatic representations of three equivalent arrangements of the mechanical parts of the new apparatus, and wherein Fig. 3 shows, as well, auxiliary equipment for collecting the cut plastic particles.

In each illustrated variation, the apparatus comprises twin cranks disposed one on each side of the extruder, twin connecting rods driven thereby, means for confining the reciprocating movement of the opposite end of the connecting rods to a fixed path, and brackets projecting from each connecting rod in planes parallel to the sides of the extruder and carrying between them a cutter bar in fixed position thereon. The apparatus is so mounted with respect to a horizontal plastics extruder having a vertical orifice plate that each revolution of the cranks will bring the horizontal edge of the cutter bar downward into tangency with the orifice plate near one end of the nearly horizontal minor axis of its elliptical path, and at that point the face of the cutter bar nearest the extruder is at an acute angle between 10° and 60° from the vertical face of the orifice plate. If, in operation, the severed plastic pellets tend to adhere to the cutter bar, they may be removed therefrom as by a fixed scraper bar against which the cutter bar will rub on its upward return path after passing its nadir, as shown in Fig. 3. This is possible because of the fixed position of the cutter on its supports, which keeps the same face forward through its elliptical orbit.

The size of the pellets produced may be altered by changing the speed of the twin cranks which drive the cutter bar. With a fixed rate of extrusion, smaller pellets are produced as the speed of the knife is increased. Production is also increased by increasing the number of orifices in the vertical orifice plate of the extruder. For uniformity in the cut pellets, all orifices should be located along the horizontal mid-line of the orifice plate, which is the line representing all points of tangency between the moving blade and that plate.

Means may be provided to cool the freshly cut hot pellets, as by an enclosed water spray (Fig. 3), and the so-cooled pellets and water emerge from the cooling zone through any simple duct or flume upon a slowly moving belt conveyor, suitably made of open mesh wire screen of a size to retain the pellets and to allow the water to pass to a waste line. The pellets are conveyed on the screen under a battery of infra-red lamps, or other suitable means for heating them to about 75° C., to evaporate remaining moisture.

In a preferred embodiment, the cutter bar is a flat strip of spring steel. Such a cutter is readily cooled while passing through the air in the idle portions of its elliptical circuit. It tends, as well, due to its springy character, to throw the severed pellets into the cooling pan.

The various forms of apparatus suggested in Figs. 1–3 do not differ significantly in their arrangement of mechanical features or in their modes of operation. The apparatus in Fig. 1 and that in Fig. 3 each have their cranks located below and displaced laterally from the extruder, while that in Fig. 2 has its cranks above the extruder. In Figs. 1 and 2, the means for confining the end of the connecting rods to a fixed path is in each case a vertically disposed guide channel in which a roller (Fig. 1) or a block (Fig. 2) attached to the connecting rod moves up and down as required by the simultaneous movement of the crank at the other end of that rod. In Fig. 3, the upper end of the connecting rod is hinged to the end of a radius rod, and moves up and down along a fixed arc, as shown.

The apparatus described has been used successfully in preparing uniform pellets or granules of polystyrene, but may be used on any extrudable organic thermoplastic.

We claim:

An apparatus for producing uniform pellets of freshly extruded organic thermoplastic material comprising a horizontal extruder for such material having a vertical orifice plate, twin cranks disposed one on each side of said extruder, twin connecting rods of much greater length than said cranks connected at one end to and adapted to be driven by said cranks, means for confining the reciprocating movement of the opposite ends of said rods to a fixed path, twin brackets projecting one from each connecting rod, in planes parallel to the sides of the extruder, a spring steel cutter bar mounted between said brackets with its cutting edge horizontal and at a level intermediate the ends of the connecting rods, so that the cutting edge defines an elliptical path on rotation of the cranks and reciprocation of the connecting rods, and means for driving said cranks; the cranks, connecting rods and cutter being so positioned with respect to the extruder that, upon rotation of the cranks, the cutter bar is carried downwardly along its elliptical path into tangency with the vertical orifice plate near the point of extrusion and near the end of the substantially horizontal minor axis of the elliptical orbit of the cutter, the cutter bar being so mounted that, at said point of tangency, the face of the bar nearest the extruder is at an acute angle of 10° to 60° from the vertical face of the orifice plate.

SAMUEL G. LUDINGTON.
KENNETH E. STOBER.

REFERENCES CITED

The following references are of record in the file of this patent:

UNITED STATES PATENTS

| Number | Name | Date |
|---|---|---|
| 461,630 | Geyer | Oct. 20, 1891 |
| 2,201,391 | Doering et al. | May 21, 1940 |
| 2,401,236 | Fielitz | May 28, 1946 |